United States Patent
Kang et al.

(10) Patent No.: US 10,685,241 B2
(45) Date of Patent: Jun. 16, 2020

(54) METHOD AND APPARATUS FOR INDICATING LANE

(71) Applicant: Samsung Electronics Co., Ltd., Suwon-si (KR)

(72) Inventors: Nahyup Kang, Seoul (KR); Young Hun Sung, Hwaseong-si (KR); KeeChang Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/467,190

(22) Filed: Mar. 23, 2017

(65) Prior Publication Data

US 2018/0129887 A1    May 10, 2018

(30) Foreign Application Priority Data

Nov. 7, 2016 (KR) .......................... 10-2016-0147378

(51) Int. Cl.
*G06K 9/00* (2006.01)
*G06T 7/70* (2017.01)
*G06T 7/77* (2017.01)

(52) U.S. Cl.
CPC ............ *G06K 9/00798* (2013.01); *G06T 7/70* (2017.01); *G06T 7/77* (2017.01); *G06T 2207/10032* (2013.01); *G06T 2207/20061* (2013.01); *G06T 2207/20076* (2013.01); *G06T 2207/20081* (2013.01); *G06T 2207/20084* (2013.01); *G06T 2207/30256* (2013.01)

(58) Field of Classification Search
CPC ....................... G06K 9/00791; G06K 9/00798
See application file for complete search history.

(56) References Cited

U.S. PATENT DOCUMENTS

| 5,555,312 | A | * | 9/1996 | Shima | ....................... B60R 1/00 |
| | | | | | 340/937 |
| 6,879,706 | B2 | | 4/2005 | Satoh et al. | |
| 8,031,063 | B2 | | 10/2011 | Schmitz | |
| 9,286,524 | B1 | | 3/2016 | Mei et al. | |
| 10,417,506 | B2 | * | 9/2019 | Satzoda | ................ B60W 30/00 |

(Continued)

FOREIGN PATENT DOCUMENTS

| JP | 2004-326559 A | 11/2004 |
| KR | 10-2011-0101990 A | 9/2011 |

(Continued)

OTHER PUBLICATIONS

Borkar, Amol, Monson Hayes, and Mark T. Smith. "Robust lane detection and tracking with ransac and kalman filter." Image Processing (ICIP), 2009 16th IEEE International Conference on. IEEE, 2009. (Year: 2009).*

Luo, LinBo, et al. "A software-hardware cooperative implementation of bird's-eye view system for camera-on-vehicle." Network Infrastructure and Digital Content, 2009. IC-NIDC 2009. IEEE International Conference on. IEEE, 2009. (Year: 2009).*

(Continued)

*Primary Examiner* — Bobbak Safaipour
(74) *Attorney, Agent, or Firm* — NSIP Law

(57) ABSTRACT

Disclosed are methods and apparatuses for indicating a lane, the method including detecting a lane marking from an input image, acquiring a bird's eye view image by applying an inverse perspective mapping to the detected lane marking, extracting control points corresponding to the lane marking from the bird's eye view image, and indicating a lane by re-projecting the control points to a space of the input image through an inverse transformation.

27 Claims, 9 Drawing Sheets

(56) References Cited

U.S. PATENT DOCUMENTS

| | | |
|---|---|---|
| 2008/0175437 A1 | 7/2008 | Ishikura et al. |
| 2010/0209883 A1 | 8/2010 | Chin et al. |
| 2010/0284569 A1* | 11/2010 | Sakurai .................. G06T 3/00 382/103 |
| 2014/0343842 A1* | 11/2014 | Ranganathan ......... G01C 21/30 701/472 |
| 2017/0147891 A1* | 5/2017 | Satzoda ............ G06K 9/00805 |
| 2017/0330043 A1* | 11/2017 | Shih ...................... H04N 5/2625 |
| 2017/0358205 A1* | 12/2017 | Ippolito ................. G08G 1/042 |
| 2017/0369057 A1* | 12/2017 | Gurghian ............... G08G 1/167 |
| 2018/0099613 A1* | 4/2018 | Yoo ......................... B60R 1/025 |
| 2018/0129887 A1* | 5/2018 | Kang ....................... G06T 7/70 |
| 2018/0131924 A1* | 5/2018 | Jung ................... H04N 13/204 |
| 2019/0095722 A1* | 3/2019 | Kang ................ G06K 9/00798 |

FOREIGN PATENT DOCUMENTS

| | | |
|---|---|---|
| KR | 10-1178507 B1 | 2/2012 |
| KR | 10-1338347 B1 | 1/2014 |
| KR | 10-1437743 B1 | 6/2014 |
| KR | 10-1595317 B1 | 11/2015 |
| KR | 10-2016-0078865 A | 7/2016 |

OTHER PUBLICATIONS

Chen, Chenyi, et al. "Deepdriving: Learning affordance for direct perception in autonomous driving." Computer Vision (ICCV), 2015 IEEE International Conference on. IEEE, 2015. (Year: 2015).*

Huval, Brody, et al. "An empirical evaluation of deep learning on highway driving." arXiv preprint arXiv:1504.01716 (2015). (Year: 2015).*

Huang, Xiaoyun, et al. "Extended-search, Bézier curve-based lane detection and reconstruction system for an intelligent vehicle." International Journal of Advanced Robotic Systems12.9 (2015): 132. (Year: 2015).*

Aly, Mohamed. "Real time detection of lane markers in urban streets." Intelligent Vehicles Symposium, 2008 IEEE. IEEE, 2008.

* cited by examiner

310

METHOD AND APPARATUS FOR INDICATING LANE

CROSS-REFERENCE TO RELATED APPLICATION(S)

This application claims the benefit under 35 USC § 119(a) of Korean Patent Application No. 10-2016-0147378 filed on Nov. 7, 2016, in the Korean Intellectual Property Office, the entire disclosure of which is incorporated herein by reference for all purposes.

BACKGROUND

1. Field

The following description relates to method and apparatus for indicating a lane.

2. Description of Related Art

Visual information augmentation realities may be provided to assist steering of vehicles and other transportations. Lane markings or road information may be extracted from a predetermined input image, and used to provide such augmentation realities.

In certain circumstances it may be difficult to accurately detect the lane due to an ambiguity of image information, such as when a lane is covered by a shade, when the lane is obscured by another vehicle, when a change in brightness or contrast of an image occurs due to a change in time such as day and night or a change in weather such as rain or snow, or when a change in lane shape such as a dashed line, a superimposed line, and a curve occurs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of indicating a lane, the method including detecting a lane marking from an input image, acquiring a bird's eye view image by applying an inverse perspective mapping to the detected lane marking, extracting control points corresponding to the lane marking from the bird's eye view image, and indicating a lane by re-projecting the control points to a space of the input image through an inverse transformation.

The detecting of the lane marking may include detecting the lane marking from the input image using a convolutional neural network (CNN) trained to recognize the lane marking.

The lane marking may include dividing a searching area of the input image using a sliding window extending in a horizontal direction, and detecting the lane marking from the divided searching area.

The sliding window may include a bounding box in a form of a stripe extending in a horizontal direction, and a size of the stripe may be gradually reduced in a direction from bottom to top of the searching area.

The acquiring of the bird's eye view image may include acquiring the bird's eye view image by applying the inverse perspective mapping based on a center of the bounding box.

The CNN may be trained on lane markings of various road surface views.

The CNN may be trained to identify a bounding box of a lane marking to be detected from the input image and a type of the lane marking to be detected.

The extracting of the control points may include performing a curve approximation on the bird's eye view image and extracting the control points corresponding to the lane marking from the bird's eye view image.

The extracting of the control points may include converting the lane marking into a curve by performing the curve approximation on the bird's eye view image, and extracting the control points corresponding to the curve.

The extracting of the control points may include performing a cubic Bezier curve approximation on the bird's eye view image through a random sample consensus (RANSAC) spline fitting and extracting the control points corresponding to the lane marking.

The extracting of the control points may include determining a straight line tendency of the lane marking by performing a Hough transformation on the bird's eye view image, establishing a bounding box proportional to a lane distance based on the straight line tendency, and extracting the control points corresponding to the lane marking by performing a RANSAC spline fitting on the lane marking in an area of the bounding box.

The input image may include at least one of a road view or a road surface view.

In another general aspect, there is an apparatus for indicating a lane, the apparatus including a communication interface configured to receive an input image, and a processor configured to detect a lane marking from an input image, extract control points corresponding to the lane marking from a bird's eye view image acquired by applying an inverse perspective mapping to the lane marking, re-project the control points to a space of the input image through an inverse transformation, and indicate a lane.

The apparatus may include a memory storing parameters of a convolutional neural network (CNN) trained to recognize the lane marking, wherein the processor may be configured to detect the lane marking from the input image using a CNN to which the parameters are applied.

The processor may be configured to divide a searching area of the input image using a sliding window extending in a horizontal direction and to detect the lane marking from the divided searching area, and the sliding window may include a bounding box in a form of a stripe extending in a horizontal direction.

The CNN may be trained to identify a bounding box of a lane marking to be detected from the input image and a type of the lane marking to be detected.

The processor may be configured to perform a curve approximation on the bird's eye view image, to convert the lane marking into a curve, and to extract the plurality of control points corresponding to the curve.

The processor may be configured to perform a cubic Bezier curve approximation on the bird's eye view image through a random sample consensus (RANSAC) spline fitting and to extract the control points corresponding to the lane marking.

The processor may be configured to perform a Hough transformation on the bird's eye view image, to calculate a straight line tendency of the lane marking, to establish a bounding box proportional to a lane distance based on the straight line tendency, to perform a RANSAC spline fitting on the lane marking in an area of the bounding box, and to extract the plurality of control points corresponding to the lane marking.

Other features and aspects will be apparent from the following detailed description, the drawings, and the claims.

Figure 1:
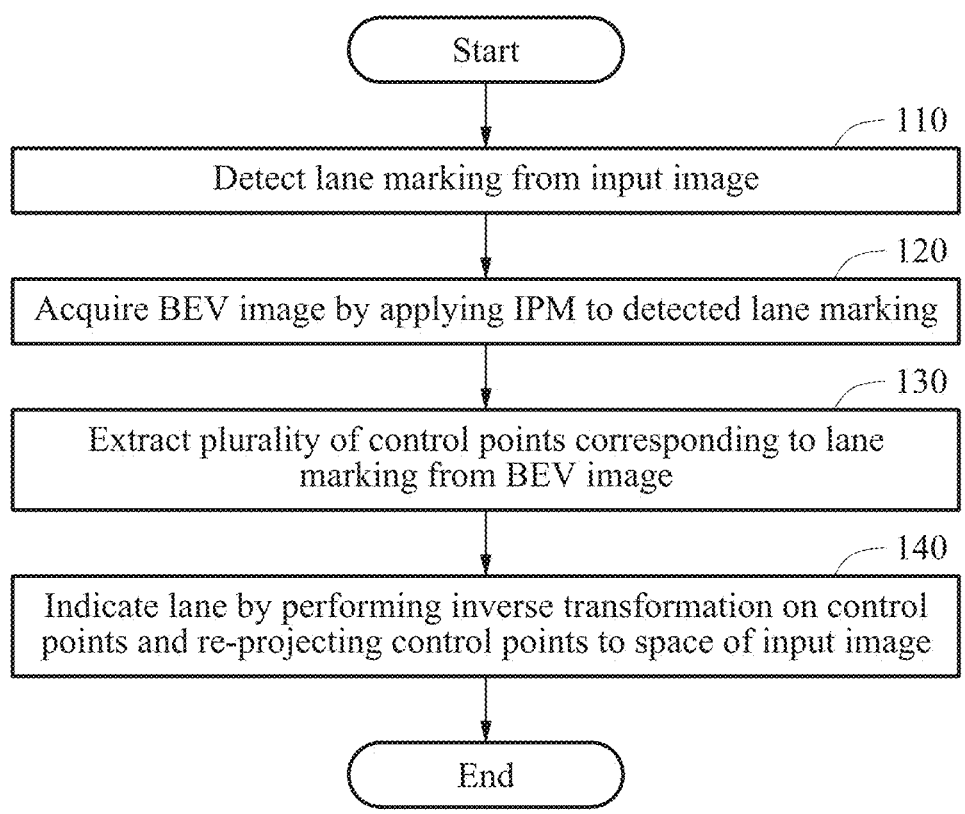
FIG. 1 illustrates an example of a method of indicating a lane.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), or (b) may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

If it is described in the specification that one component is "connected," "coupled," or "joined" to another component, a third component may be "connected," "coupled," and "joined" between the first and second components, although the first component may be directly connected, coupled or joined to the second component. Likewise, expressions, for example, "between" and "immediately between" and "adjacent to" and "immediately adjacent to" may also be construed as described in the foregoing. The terminology used herein is for describing particular embodiments only and is not intended to be limiting. As used herein, the singular forms "a," "an," and "the," are intended to include the plural forms as well, unless the context clearly indicates otherwise.

The following embodiments may be applied to indicate a lane in an augmented reality navigation system that are installed in vehicles, such as, for example, a smart vehicle, an intelligent vehicle, an electric vehicle, a hybrid vehicle. In an example, the following embodiments may be applied to generate visual information for assisting steering of an autonomous driving vehicle. In an example, the following embodiments may be applied to a navigation system of a vehicle. The embodiments may also be used to interpret the visual information in a device including an intelligent system such as a head-up display (HUD) installed for driving assistance in a vehicle or a fully autonomous driving system to assist safe and comfortable driving. In an example, the following embodiments may be embedded in or interoperate with various digital devices such as, for example, a mobile phone, a cellular phone, a smart phone, a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, a wearable device, an autonomous driving vehicle including a camera or a vision sensor, other consumer electronics/information technology(CE/IT) device, or any other device capable of wireless communication or network communication consistent with that disclosed herein.

FIG. 1 illustrates an example of a method of indicating a lane. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

Referring to FIG. 1, in 110, an apparatus for indicating a lane detects a lane marking from an input image. Hereinafter, the apparatus for indicating a lane is also referred to as an indicating apparatus. In an example, the input image includes a road surface image and a road image. The road image may include, for example, a vehicle, a lane, a sidewalk, and a surrounding environment.

In 110, in an example, the indicating apparatus divides a searching area of the input image using a sliding window extending in a horizontal direction, and detects a lane marking from the divided searching area. In an example, the indicating apparatus detects the lane marking from the input image using a deep neural network (DNN) or a convolutional neural network (CNN) trained to recognize the lane marking.

In an example, the CNN is a region-based CNN and trained on lane markings of various road surface images. The CNN is trained to identify a bounding box of a lane marking to be detected and a type of the lane marking to be detected from the input image. By using CNN learning the lane marking of various road surface images, the lane marking is detected robustly in various situations. A method of detecting a lane marking in the indicating apparatus will be described with reference to FIGS. 2 through 4.

In 120, the indicating apparatus acquires a bird's eye view (BEV) image by applying an inverse perspective mapping (IPM) to the lane marking detected in operation 110. The indicating apparatus applies the IPM to a road image converging to a vanishing point and converts the road image to a BEV image in an above-viewed form such that the lane marking is recognized with increased uniformity and clarity. In the BEV image, a lane identifiability is relatively high.

The IPM removes a distance effect from an input image to which the distance effect is applied and converts location information of an image plane to location information of a real-world coordinate system. Through the IPM, the indicating apparatus expresses a relative location of a vehicle to a road defined based on a direction of the vehicle and a normal distance from a center line of the road to the origin of the vehicle using location information of a lane represented by real-world coordinates.

The indicating apparatus acquires the BEV image by applying the IPM based on a center of the bounding box included in the sliding window. The indicating apparatus applies the IPM to the detected lane marking excluding an ambient image, thereby significantly reducing an amount of calculation when compared to converting pixels of the entire image. The BEV image acquired by the indicating apparatus applying the IPM to the detected lane marking will be described with reference to FIG. 5.

In 130, the indicating apparatus extracts a plurality of control points corresponding to the lane marking from the BEV image. The indicating apparatus extracts the plurality of control points corresponding to each of the lane markings from the BEV image through a curve approximation of the BEV image. In an example, the number of control points is four or more. In an example, the indicating apparatus extracts the plurality of control points corresponding to each of the lane markings by performing a cubic Bezier curve approximation on the BEV image through a random sample consensus (RANSAC) spline fitting. In this example, RANSAC is a method of randomly selecting pieces of sample data, selecting data corresponding to a maximal consensus, and performing an approximation.

A method of extracting the control points using the indicating apparatus will be described with reference to FIGS. 6 and 7.

In 140, the indicating apparatus indicates a lane by performing an inverse transformation on the plurality of control points and re-projecting the control points to a space of the input image.

The indicating apparatus outputs or displays information on a lane that is important for driving based on a predetermined road image. The information on the lane may be used as element technology in a high-level driving assistance system such as, for example, a vehicle location matching [SA1].

Figure 2:
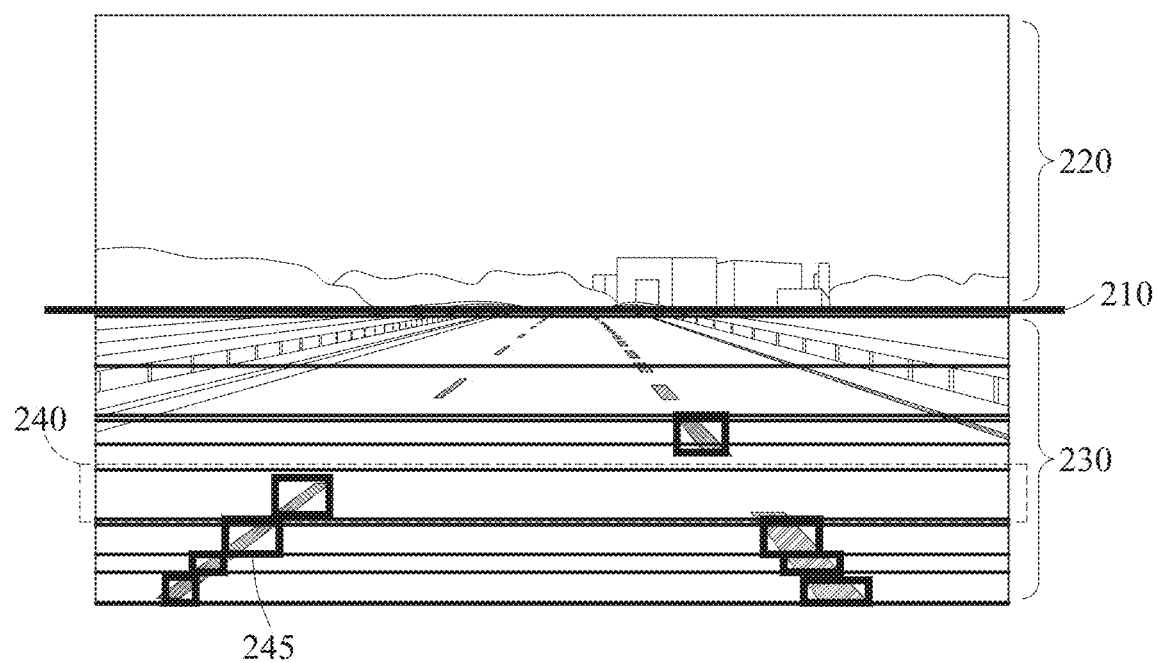
FIG. 2 illustrates an example of a method of dividing a searching area of an input image.

FIG. 2 illustrates an example of a method of dividing a searching area of an input image. FIG. 2 illustrates an image divided into an upper portion 220 corresponding to a non-searching area and a lower portion 230 corresponding to a searching area relative to a horizontal line 210 based on a vanishing point in an input image.

An indicating apparatus acquires an input image for each frame using a capturing device mounted on a front face of a vehicle. In an example, the calibration information of the capturing device is known. The capturing device includes, for example, a mono camera, a vision sensor, or a device of performing a similar operation.

Based on the horizontal line 210, the indicating apparatus discards the upper portion 220 of the input image and divides the lower portion 230 as a searching area. The indicating apparatus generates a stripe 240 such that a size of the stripe is gradually reduced in a direction from a bottom of the lower portion 230 to a top of the lower portion 230. The indicating apparatus may generate the stripe 240 such that the size of the stripe 240 is gradually reduced in a direction from bottom to top on the searching area and may also generate the stripe 240 in the same size from a bottom of the searching area to a top of the searching area. In this example, the indicating apparatus performs a division on the searching area based on a perspective view of the input image without a change.

When a resolution of the input image is 1280×720 dots per inch (dpi), the indicating apparatus discards a half portion corresponding to the upper portion 220 of the input image, and maintains a portion of 1280×360 dpi corresponding to the lower portion 230. The indicating apparatus gradually divides the lower portion 230 into areas of 1280× 20 dpi, 1280×18 dpi, 1280×16 dpi, . . . , 1280×2 dpi from a lowermost end of the lower portion 230.

The indicating apparatus divides the input image into stripe including the stripe 240 in a horizontal direction such that a dataset used for training is increased. Also, in an actual process of detecting a lane marking, the indicating apparatus searches a searching area for the lane marking using vertical sliding windows to increase a searching speed.

The indicating apparatus estimates an element of interest, for example, a lane marking included in the stripe 240 using a bounding box 245. In this example, the indicating apparatus obtains the bounding box 245 in a size corresponding to the lane marking irrespective of a size of the input image.

A ground truth for learning may be provided in a form of annotation that represents the element of interest, for example, the lane marking indicated in the bounding box 245. The learning is performed based on, for example, a supervised learning scheme. To perform the supervised learning scheme, a ground truth about which portion or area of a learning input image corresponds to the lane marking may be required.

The ground truth about which portion or area of a training input image is obtained by, for example, dividing an input image into the stripe 240 for increasing an amount of learning data and indicating a portion corresponding to the lane marking for each stripe using the bounding box 245. The bounding box 245 includes an annotation representing a 2D box, for example, an x coordinate, a y coordinate, a width, and a height.

The indicating apparatus may increase a processing efficiency at least two times by removing the upper portion 220 above the horizontal line 210 and eliminating the upper portion 220 from a learning or testing process.

The indicating apparatus divides the searching area of the input image using the vertical sliding window and detects the lane marking from the divided searching area in a real-time processing. The indicating apparatus detects the lane marking from the input image using a CNN that is trained to recognize the lane marking.

The indicating apparatus inputs the input image for each of the stripes to a lane marking detector based on a trained CNN to acquire a detection result. The detection result may be obtained in a form of the bounding box 245 including the lane marking for each of the stripes. A detected lane marking is represented as shown in FIG. 3.

The indicating apparatus performs an IPM on a center of the bounding box 245. The indicating apparatus performs the IPM based on the calibration information of the capturing device acquired in advance.

Figure 3:
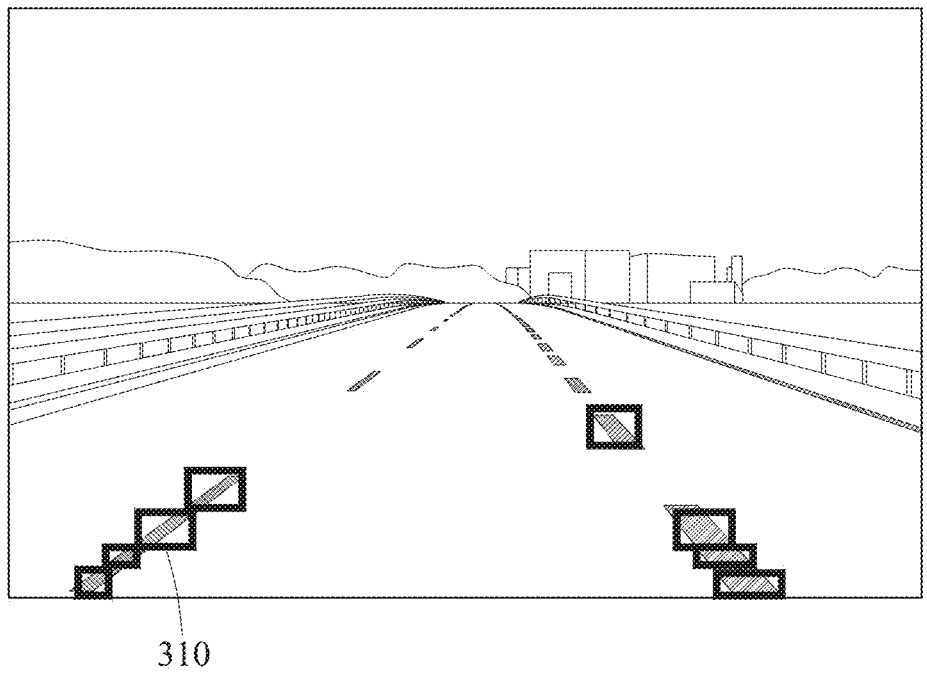
FIG. 3 illustrates an example of a detected lane marking.

FIG. 3 illustrates an example of a detected lane marking. FIG. 3 illustrates lane markings detected in a form of bounding boxes including a bounding box 310.

As explained above, an indicating apparatus gradually reduces a size of stripe in a direction from bottom to top in a lower portion of an image such that an actual road distance is uniformed.

Since lane marking detection results are obtained based on the number of lane markings for each stripe, an amount of IPM calculation may be significantly reduced. For example, since the IPM calculation is performed by the number of times corresponding to the number of lanes x the number of stripes, an amount of IPM calculation may be significantly reduced as compared to a case in which the IPM calculation is performed by the total number of pixels.

For example, the number of lanes is eight, and the number of stripes is 100.

In this example, the IPM is performed 800 times according to an equation "the number of bounding boxes to be detected=the number of lanes x the number of stripes=800". In contrast, when performing the IPM on the entire high definition (HD) image in a size of 1280×720 dpi, the IPM is performed 921600 (=1280×720) times. Thus, an amount of calculation is reduced to at least about 1/900.

Figure 4:
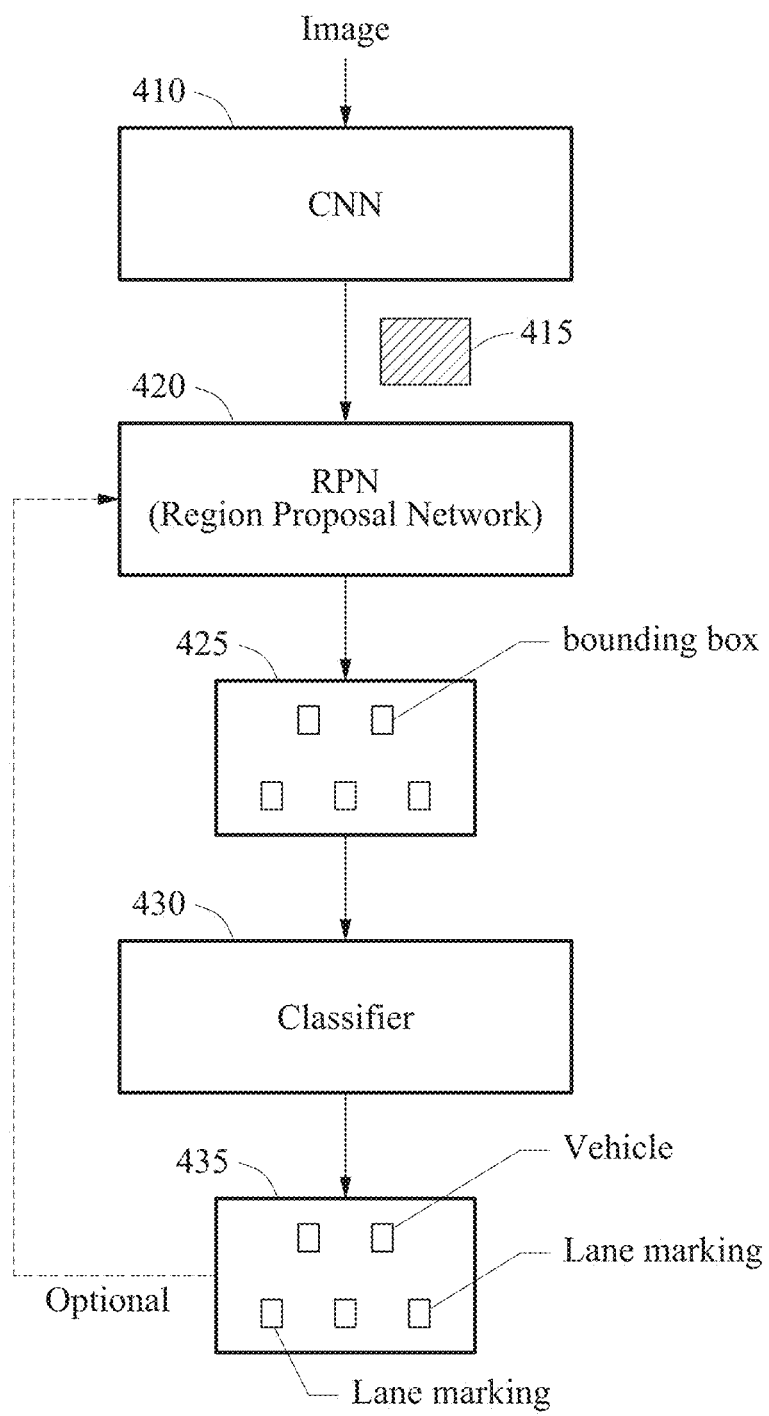
FIG. 4 illustrates an example of a method of detecting a lane marking using a convolutional neural network (CNN).

FIG. 4 illustrates an example of a method of detecting a lane marking using a convolutional neural network (CNN). FIG. 4 illustrates a process of detecting a lane marking using a CNN.

An indicating apparatus detects a lane marking to increase a performance in recognizing and detecting a CNN using the following scheme. A CNN 410 is, for example, a region-based CNN such as a faster R-CNN.

The CNN 410 is trained to identify a bounding box of a target, for example, a lane marking to be detected from an input image and a type of the target.

For example, when using a filter susceptible for a vertical component, the CNN may include road curbs or guard rails as noise components, may not respond to curve markings, and, may be vulnerable to variations. The road curbs and guard rails may be solved using a learning-based CNN susceptible for a horizontal component.

The indicating apparatus applies a feature 415 output from the CNN 410 to a region proposal network (RPN) 420 and calculates initial candidate bounding boxes. The indicating apparatus detects a presence of a bounding box corresponding to an element of interest, for example, the lane marking from the initial candidate bounding boxes 425 using the RPN 420.

A classifier 430 outputs a result 435 obtained by classifying the initial candidate bounding boxes 425 into different categories, such as, for example, a bounding box corresponding to a lane and a bounding box corresponding to a sidewalk.

The classifier 430 includes, for example, a region of interest (ROI) pooling layer, a fully-connected (FC) layer, and class scores.

The ROI pooling layer selects a bounding box selected from features of a CNN for the entire input image or a feature corresponding to an ROI of the selected bounding box.

The FC layer determines a type of class using the feature selected in the ROI pooling layer as an input. The class scores quantify a reliability on a class of the bounding box.

Depending on examples, the result 435 output through the classifier is applied to the RPN 420 again and used to classify bounding boxes with increased accuracy. Through this, the indicating apparatus detects the lane marking corresponding to the element of interest.

Figure 5:
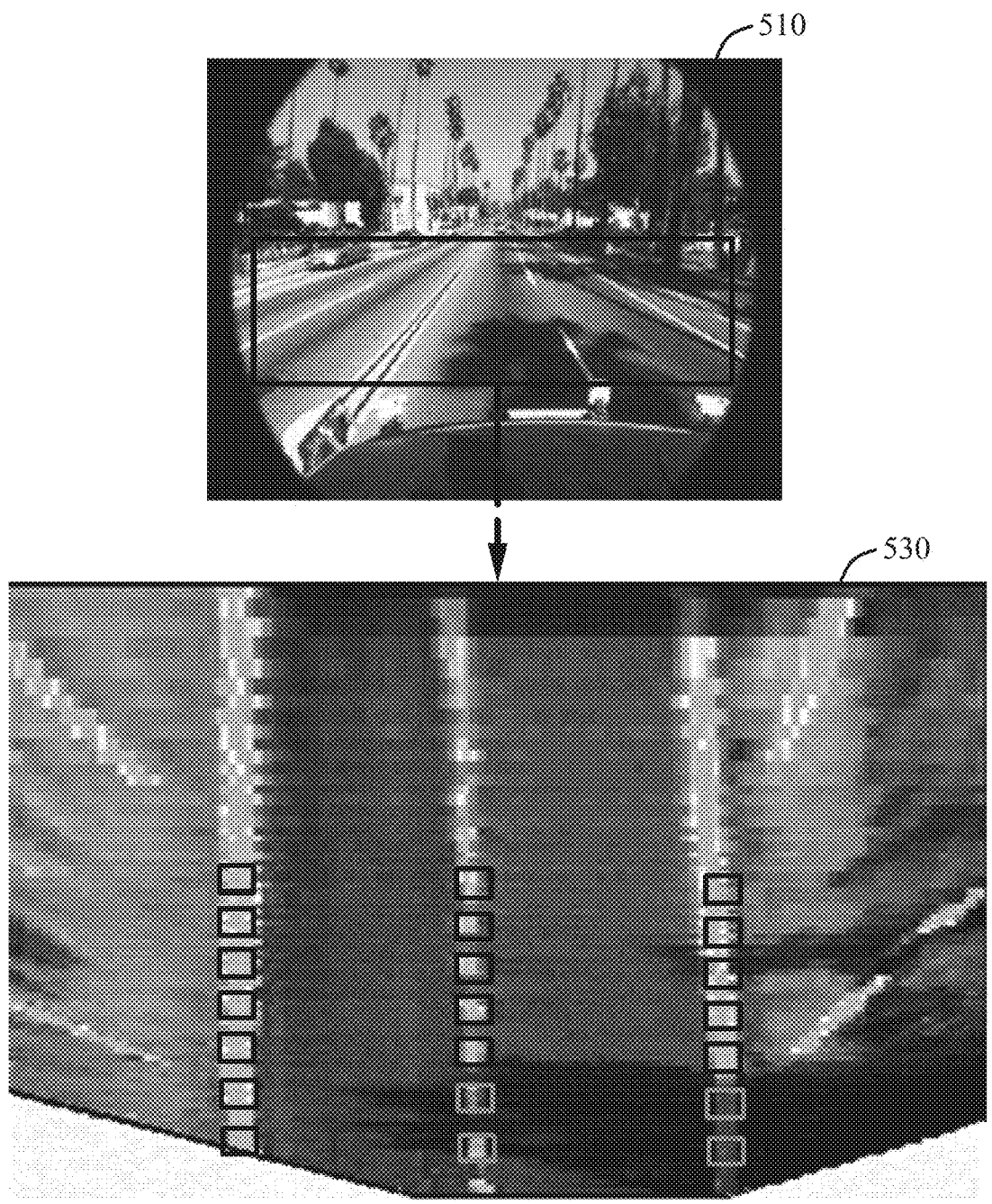
FIG. 5 illustrates an example of a bird's eye view image acquired by applying an inverse perspective mapping on a detected lane marking.

FIG. 5 illustrates an example of a bird's eye view image acquired by applying an IPM on a detected lane marking. FIG. 5 illustrates an input image 510 and an image 530 obtained by performing an IPM on a lane marking detected from the input image 510.

An indicating apparatus acquires the image 530 by performing the IPM based on a bounding box. The indicating apparatus performs a curve approximation on a BEV image and converts a lane marking in the BEV image into a curve. Thereafter, the indicating apparatus extracts a plurality of control points corresponding to the curve.

The indicating apparatus applies the IPM on the detected lane only. Thus, the indicating apparatus reduces an amount of calculation and increase lane identifiability, thereby extracting a more precise lane curve in a process of curving a lane.

Figure 6:
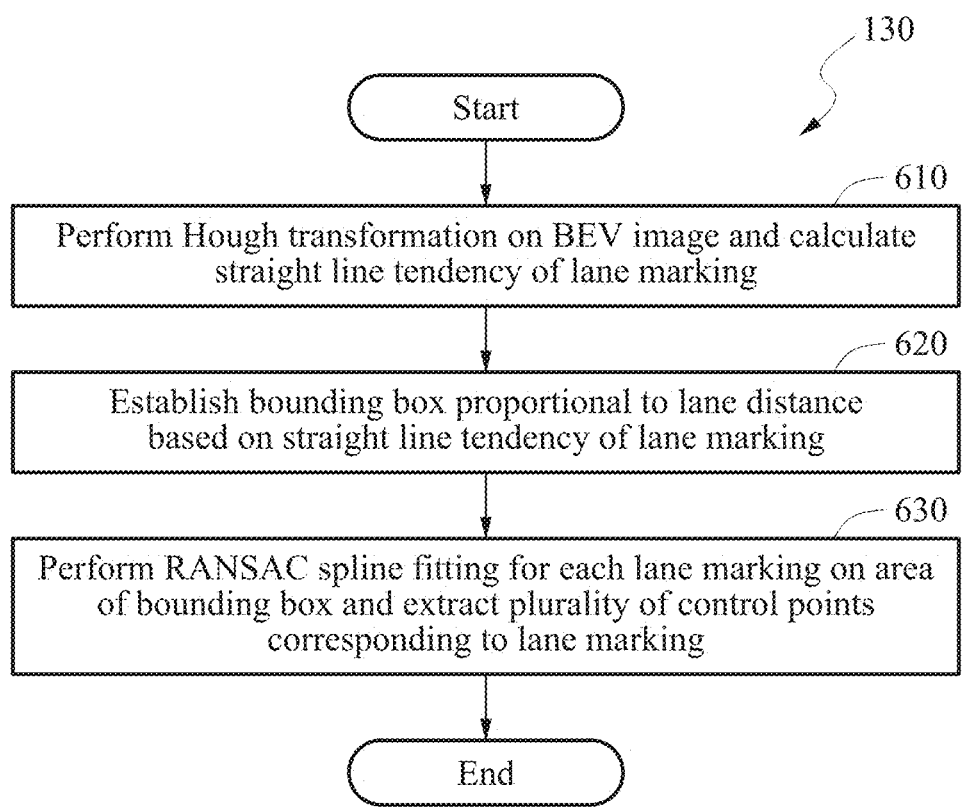
FIG. 6 illustrates an example of extracting a plurality of control points.

FIG. 6 illustrates an example of extracting a plurality of control points. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the above descriptions of FIGS. 1-5 are also applicable to FIG. 6, and are incorporated herein by reference. Thus, the above description may not be repeated here.

Referring to FIG. 6, in 610, an indicating apparatus performs a Hough transformation on a BEV image and calculates a straight line tendency of a lane marking. When points are distributed in a predetermined type of line, for example, a straight line or a curved line such as a circle and an oval in an image, a line equation connecting the points is obtained. When a distribution of the points is in a form of a line, a type of the line may be determined and a shape of the line may be expressed by an equation to obtain the line through a mapping in a parameter space. The foregoing process is, for example, a Hough transformation. In 610, the indicating apparatus calculates or determines an approximate straight-line lane by performing the Hough transformation on the BEV image as further described with reference to an approximate straight-line lane 710 of FIG. 7.

In 620, the indicating apparatus establishes a bounding box proportional to a lane distance based on the straight line tendency of the lane marking. For example, he indicating apparatus sets a bounding box in a parallelogram shape proportional to a lane distance of 3.5 m based on information on the approximate straight-line lane determined in operation 610 as further described with reference to a consensus bounding box 730 of FIG. 7.

In 630, the indicating apparatus performs an RANSAC spline fitting for each lane marking on an area of the bounding box and extracts a plurality of control points corresponding to the lane marking. The indicating apparatus extracts at least four control points for every single lane.

Figure 7:
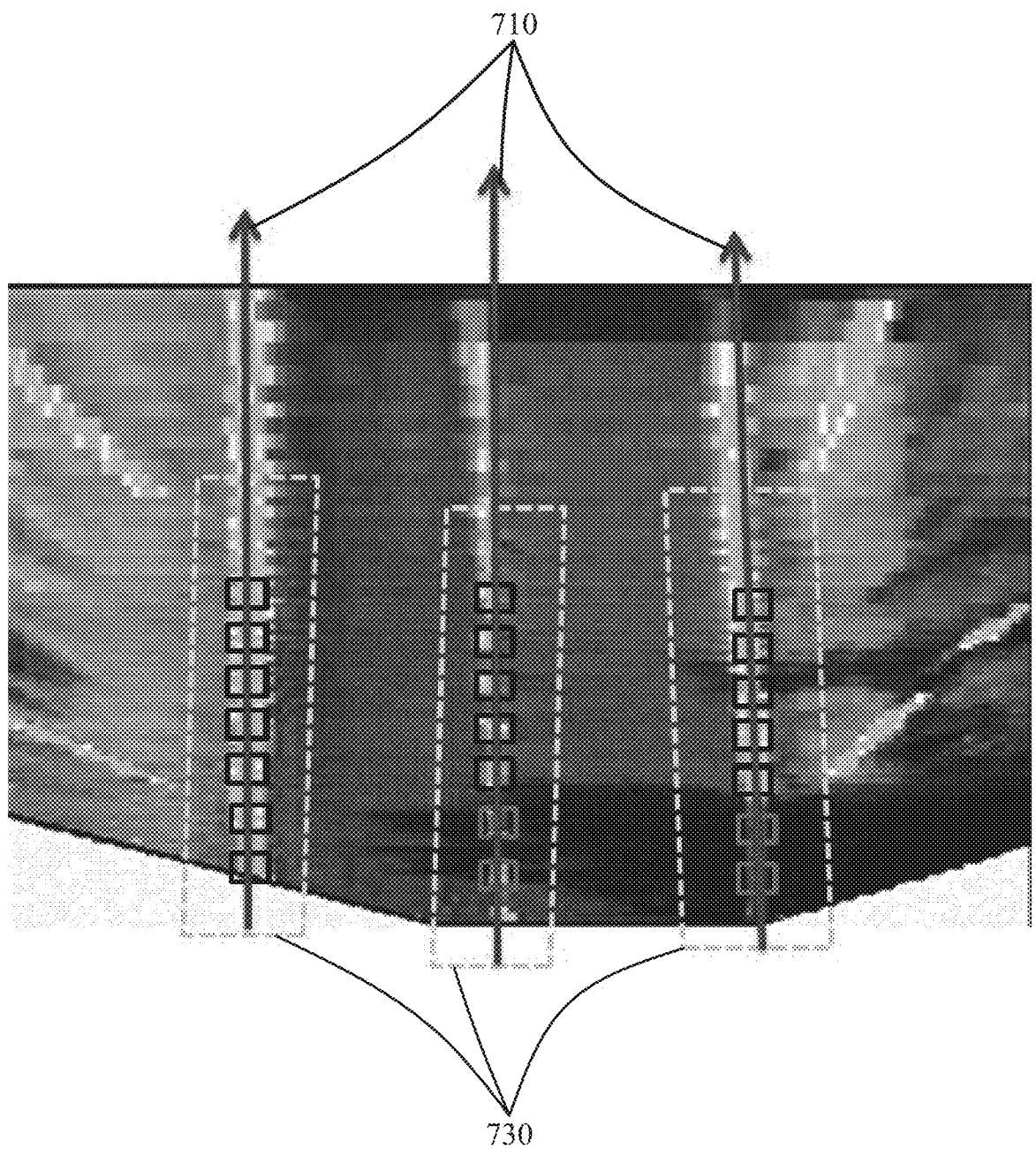
FIG. 7 illustrates an example of a random sample consensus (RANSAC) spline fitting result.

FIG. 7 illustrates an example of a RANSAC spline fitting result. For example, a lane distance is about 3.5 m and a length of a lane marking is about 15 cm. In this example, an indicating apparatus extracts control points through the aforementioned process of FIG. 6 to enable curve extraction for each lane marking and reduce a possibility of confusion among lanes.

Referring to FIG. 7, the indicating apparatus calculates or detects the approximate straight-line lane 710 through a Hough transformation of a BEV image.

The indicating apparatus sets the consensus bounding box 730 proportional to the lane distance of 3.5 m based on a straight line tendency of the lane marking, for example, the approximate straight-line lane 710. In this example, the consensus bounding box 730 may be in a shape of parallelogram.

By setting the consensus bounding box 730, the indicating apparatus prevents adjacent lanes from intervening in a consensus during the RANSAC spline fitting. The indicating apparatus uses a detection result in the consensus bounding box 730 for a consensus counting of the RANSAC.

The indicating apparatus extracts a plurality of control points using a detection result in a parallelogram area obtained from a straight line in a process of consensus verification. Also, for robust processing of a dashed-line lane, the indicating apparatus acquires a curve lane through an anisotropic application such that a horizontal error is higher than a vertical error in a process of consensus evaluation.

Figure 8:
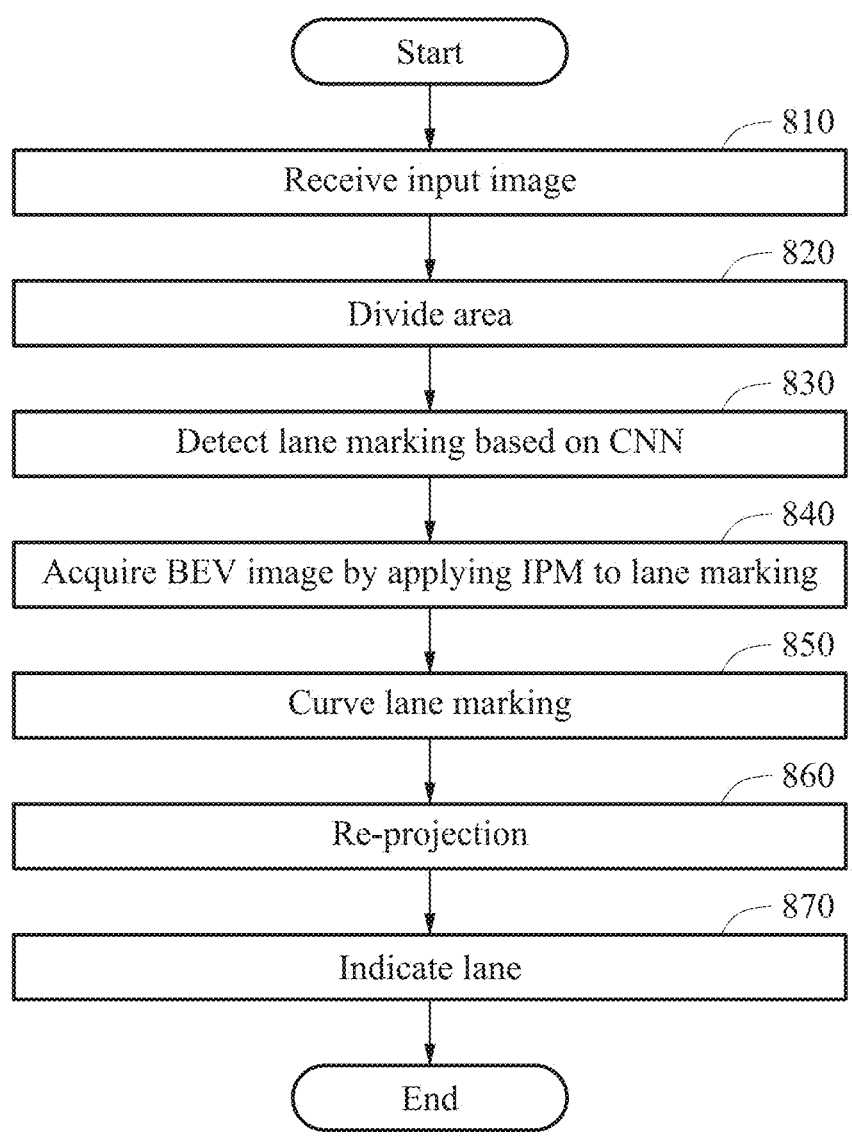
FIG. 8 illustrates an example of a method of indicating a lane.

FIG. 8 illustrates an example of a method of indicating a lane. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the above descriptions of FIGS. 1-7, are also applicable to FIG. 8, and are incorporated herein by reference. Thus, the above description may not be repeated here.

Referring to FIG. 8, in 810, an indicating apparatus receives an input image capturing a front view from a vehicle. In 820, the indicating apparatus divides a searching area from the input image.

In 830, the indicating apparatus detects a lane marking based on a CNN trained in advance. The indicating apparatus detects the lane marking using various machine learning methods.

In 840, the indicating apparatus acquires a BEV image by applying an IPM to the lane marking detected in 830.

In 850, the indicating apparatus curves the lane marking through a RANSAC spline fitting in the IPM. The indicating apparatus performs a lane curving by performing the RANSAC spline fitting on lane marking points marked in a space of the BEV image on which the IPM is performed, and extract four control points for each lane.

In 860, the indicating apparatus re-projects the control points to a space of the original input image and acquires a final curve. In 870, the indicating apparatus indicates the final curve as a lane.

Figure 9:
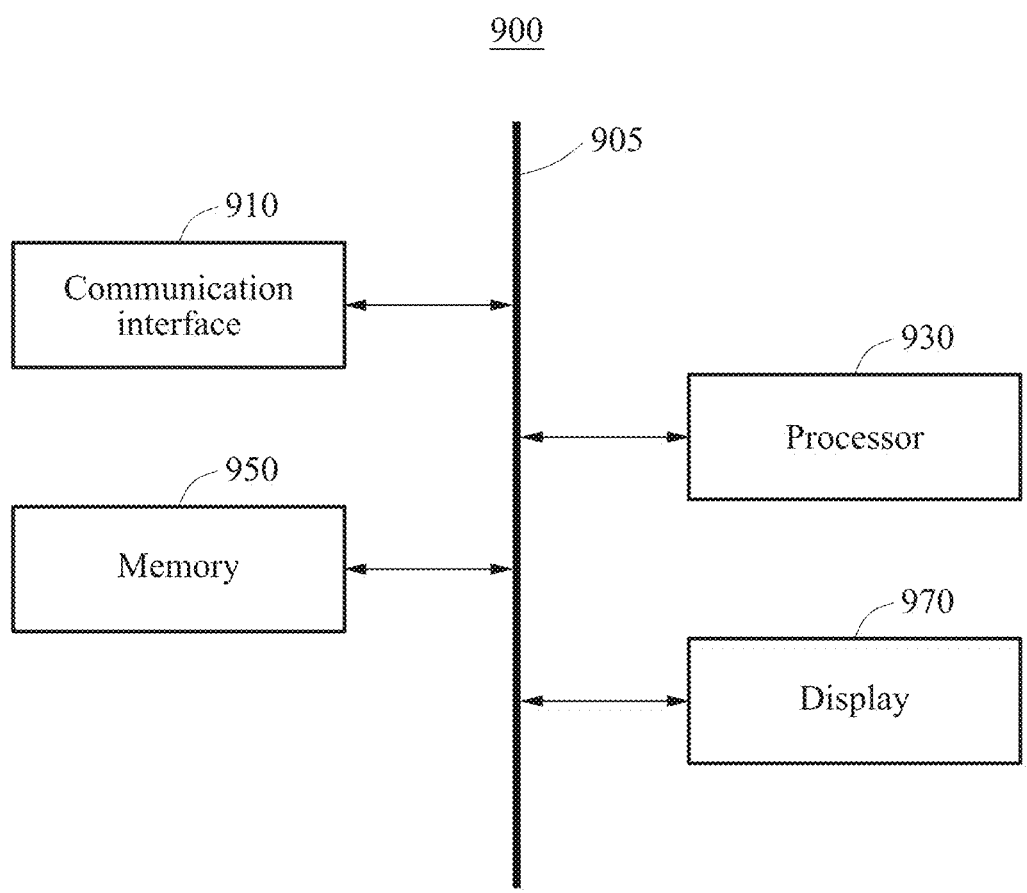
FIG. 9 illustrates an example of a lane indicating apparatus.

FIG. 9 illustrates an example of a lane indicating apparatus. Referring to FIG. 9, an apparatus 900 for indicating a lane includes a communication interface 910, a processor 930, a memory 950, and a display 970. The communication interface 910, the processor 930, the memory 950, and the display 970 are connected to one another through a communication bus 905.

The communication interface 910 receives an input image.

The processor 930 detects a lane marking from the input image. The processor 930 extracts a plurality of control points corresponding to each of lane markings from a BEV image acquired by applying an IPM on the detected lane marking. The processor 930 performs an inverse transformation on the plurality of control points, re-projects the control points to a space of the input image, and indicates a lane.

The memory 950 includes parameters of a CNN that is trained to recognize the lane marking. The processor 930 detects the lane marking from the input image using a CNN, whose parameters are included in the memory 950. The CNN may be trained to identify a bounding box of a lane marking to be detected from the input image and a type of the lane marking to be detected.

The processor 930 divides a searching area of the input image using a sliding window extending in a horizontal direction and detects the lane marking from the divided searching area. The sliding window includes a bounding box in a form of a stripe extending in a horizontal direction.

The processor 930 performs a curve approximation on the BEV image and converts the lane marking into a curve in the BEV image. The processor 930 extracts a plurality of control points corresponding to a curve into which each of the lane markings is converted.

The processor 930 performs a cubic Bezier curve approximation on the BEV image through a RANSAC spline fitting and extracts the plurality of control points corresponding to each of the lane markings.

The processor 930 performs a Hough transformation on the BEV image and calculates a straight line tendency of the lane marking. The processor 930 establishes a bounding box proportional to a lane distance based on the straight line tendency. The processor 930 performs the RANSAC spline fitting on each of lane markings in an area of the bounding box and extracts a plurality of control points corresponding to each of the lane markings.

The memory 950 stores various pieces of information generated in a process of operation of the processor 950. The memory 950 also stores various pieces of data and programs. The memory 950 includes a volatile memory or a non-volatile memory and is further described below. The memory 950 includes a high-capacity medium such as a hard disk to store various pieces of data.

In an example, the information on a lane is displayed on the display 970. In an example, the display 970 may be a physical structure that includes one or more hardware components that provide the ability to render a user interface and/or receive user input. The display 970 can encompass any combination of display region, gesture capture region, a touch sensitive display, and/or a configurable area. In an example, the display 970 can be embedded in the apparatus 900 for indicating a lane. In an example, the display 970 is an external peripheral device that may be attached to and detached from the apparatus 900 for indicating a lane. The display 970 may be a single-screen or a multi-screen display. A single physical screen can include multiple displays that are managed as separate logical displays permitting different content to be displayed on separate displays although part of the same physical screen. The display 970 may also be implemented as an eye glass display (EGD), which includes one-eyed glass or two-eyed glasses.

The apparatuses, units, modules, devices, and other components that perform the operations described in this application are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 6, and 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of indicating a lane, the method comprising:
   detecting a plurality of lane markings from an input image by determining a bounding box for each of the lane markings;
   acquiring a bird's eye view image by performing an inverse perspective mapping based on the determined bounding boxes;
   extracting control points corresponding to the lane marking from the bird's eye view image; and
   indicating a lane by re-projecting the control points to a space of the input image.

2. The method of claim 1, wherein the detecting of the lane markings comprises detecting the lane markings from the input image using a convolutional neural network (CNN) trained to recognize the lane markings.

3. The method of claim 2, wherein the CNN is trained on lane markings of various road surface views.

4. The method of claim 2, wherein the CNN is trained to identify the bounding boxes of the lane markings to be detected from the input image and a type of the lane marking to be detected.

5. The method of claim 1, wherein the detecting of the lane markings comprises:
   dividing a searching area of the input image using a sliding window extending in a horizontal direction; and
   detecting the lane markings from the divided searching area.

6. The method of claim 5, wherein the sliding window comprises at least one of the bounding boxes in a form of a stripe extending in a horizontal direction, and
   a size of the stripe is gradually reduced in a direction from bottom to top of the searching area.

7. The method of claim 6, wherein the acquiring of the bird's eye view image comprises acquiring the bird's eye view image by applying the inverse perspective mapping based on a center of each of the bounding boxes.

8. The method of claim 1, wherein the extracting of the control points comprises performing a curve approximation on the bird's eye view image and extracting the control points corresponding to the lane markings from the bird's eye view image.

9. The method of claim 8, wherein the extracting of the control points comprises:
   converting the lane markings into a curve by performing the curve approximation on the bird's eye view image; and
   extracting the control points corresponding to the curve.

10. The method of claim 1, wherein the extracting of the control points comprises performing a cubic Bezier curve approximation on the bird's eye view image through a random sample consensus (RANSAC) spline fitting and extracting the control points corresponding to the lane markings.

11. The method of claim 1, wherein the extracting of the control points comprises:
    determining a straight line tendency of the lane markings by performing a Hough transformation on the bird's eye view image;
    establishing a bounding box proportional to a lane distance based on the straight line tendency; and
    extracting the control points corresponding to the lane markings by performing a RANSAC spline fitting on the lane markings in an area of the bounding box.

12. The method of claim 1, wherein the input image comprises at least one of a road view or a road surface view.

13. A non-transitory computer-readable medium storing instructions that, when executed by one or more processors, cause the one or more processors to perform the method of claim 1.

14. The method of claim 1, wherein the detecting of the lane markings comprises:
    dividing at least a portion of the input image into widthwise segments; and
    detecting the lane markings from one of the widthwise segments.

15. The method of claim 14, wherein:
    heights of the widthwise segments decrease in a direction from a lower portion of the input image to an upper portion of the image, and
    each of the widthwise segments covers a same amount of road distance in the input image.

16. The method of claim 1, wherein the detecting of the bird's eye view image comprises excluding an area adjacent to at least one of the detected lane markings from the inverse perspective mapping used in the acquiring of the bird's eye view image.

17. The method of claim 1, further comprising:
    obtaining the input image; and
    determining a position of the lane based on the bird's eye view image,
    wherein the acquiring of the bird's eye view image comprises generating the bird's eye view image based on the input image by selectively performing the inverse perspective mapping, wherein an area of the bird's eye view image that does not corresponding to the lane markings of the input image is excluded from the inverse perspective mapping.

18. A processor-implemented method of indicating a lane, the method comprising:
    detecting a lane marking from an input image;
    acquiring a bird's eye view image by applying an inverse perspective mapping to the detected lane marking;
    extracting control points corresponding to the lane marking from the bird's eye view image; and
    indicating a lane by re-projecting the control points to a space of the input image through an inverse transformation,
    wherein the detecting of the lane marking comprises:
        dividing a searching area of the input image using a sliding window extending in a horizontal direction; and
        detecting the lane marking from the divided searching area,
    wherein the sliding window comprises a bounding box in a form of a stripe extending in a horizontal direction,
    wherein a size of the stripe is gradually reduced in a direction from bottom to top of the searching area, and
    wherein the acquiring of the bird's eye view image comprises acquiring the bird's eye view image by applying the inverse perspective mapping based on a center of the bounding box.

19. An apparatus for indicating a lane, the apparatus comprising:
a communication interface configured to receive an input image; and
one or more processors configured to:
detect a plurality of lane markings from the input image by determining a bounding box for each of the lane markings,
extract control points corresponding to the lane marking from a bird's eye view image acquired by performing an inverse perspective mapping based on the determined bounding boxes, and
indicate a lane by re-projecting the control points to a space of the input image.

20. The apparatus of claim 19, further comprising:
a memory configured to store parameters of a trained convolutional neural network (CNN) trained to recognize the lane markings,
wherein the one or more processors are configured to perform the detection of the lane markings from the input image using a CNN to which the parameters are applied.

21. The apparatus of claim 20, wherein the trained CNN is trained to identify the bounding boxes of the lane markings to be detected from the input image and a type of the lane marking to be detected.

22. The apparatus of claim 19, wherein:
the one or more processors are further configured to divide a searching area of the input image using a sliding window extending in a horizontal direction and to detect the lane markings from the divided searching area, and
the sliding window comprises at least one of the bounding boxes in a form of a stripe extending in a horizontal direction.

23. The apparatus of claim 19, wherein the one or more processors are further configured to perform a curve approximation on the bird's eye view image, to convert the lane markings into a curve, and to extract the plurality of control points corresponding to the curve.

24. The apparatus of claim 19, wherein the one or more processors are further configured to perform a cubic Bezier curve approximation on the bird's eye view image through a random sample consensus (RANSAC) spline fitting and to extract the control points corresponding to the lane markings.

25. The apparatus of claim 19, wherein the one or more processors are further configured to perform a Hough transformation on the bird's eye view image, to calculate a straight line tendency of the lane markings, to establish a bounding box proportional to a lane distance based on the straight line tendency, to perform a RANSAC spline fitting on the lane markings in an area of the bounding box, and to extract the plurality of control points corresponding to the lane markings.

26. A processor-implemented method of indicating a lane, the method comprising:
obtaining an input image;
generating a bird's eye view image based on the input image by performing an inverse perspective mapping only on areas corresponding to one or more lane markings of the input image; and
determining a position of one or more lanes corresponding to the one or more lane markings based on the bird's eye view image.

27. The method of claim 26, further comprising projecting an indication of the one or more lanes to a space of the input image based on the determined position of the one or more lanes.

* * * * *